United States Patent
Masuda et al.

(10) Patent No.: US 6,428,856 B1
(45) Date of Patent: Aug. 6, 2002

(54) METHOD OF FORMING COATING FILMS

(75) Inventors: Kazuaki Masuda, Osaka; Tsuyoshi Harakawa, Kyoto; Teruaki Kuwajima; Yutaka Takeuchi, both of Osaka, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/562,075

(22) Filed: May 1, 2000

(30) Foreign Application Priority Data

Apr. 30, 1999 (JP) ............................................ 11-124008
Feb. 25, 2000 (JP) ......................................... 2000-049807

(51) Int. Cl.⁷ .................................................. B05D 7/00
(52) U.S. Cl. ..................... 427/412.3; 427/404; 427/405; 427/407.1; 427/409; 427/412.5; 428/423.1; 428/425.9
(58) Field of Search ............................... 427/402, 407.1, 427/404, 405, 409, 412.1, 412.3, 412.5; 428/423.1, 425.9

(56) References Cited

U.S. PATENT DOCUMENTS

| 4,403,003 A | * 9/1983 | Backhouse ................ 427/407.1 |
| 4,977,219 A | 12/1990 | Watson, Jr. ............... 525/329.5 |
| 5,117,059 A | 5/1992 | Tylor ........................... 564/252 |
| 5,834,555 A | 11/1998 | Meisenburg et al. ........ 524/591 |
| 6,180,181 B1 | * 1/2001 | Verardi et al. .............. 427/409 |

FOREIGN PATENT DOCUMENTS

| EP | 0 241 805 | 10/1987 |
| EP | 0 368 375 | 5/1990 |
| EP | 0 792 908 | 9/1997 |

* cited by examiner

Primary Examiner—Paul Thibodeau
Assistant Examiner—Christopher Paulraj
(74) Attorney, Agent, or Firm—Sughrue Mion, PLLC

(57) ABSTRACT

A method is provided of forming multilayer coating films having a high quality appearance while controlling interfacial bleeding or inversion between coating film layers otherwise found when a water-borne intermediate coating film and a water-borne metallic coating film are formed in that order.

The method comprising forming coating films one after another on a substrate, namely forming an intermediate coating film using a water-borne intermediate coating, a metallic base coating film using a water-borne metallic base coat and a clear coating film using a clear coat, wherein said water-borne intermediate coating and/or said water-borne metallic base coat contains a polycarbodiimide compound and a carboxyl-containing aqueous resin.

12 Claims, No Drawings

METHOD OF FORMING COATING FILMS

FIELD OF THE INVENTION

The present invention relates to a method of a metallic coating film to be formed on an automotive body or automotive part and to a multilayer coating film obtained by the method.

PRIOR ART

The amount of an organic volatile solvent(s) in the step of application and curing by baking of coatings for automobiles is generally large and, for reducing the number of steps, attempts have been made to convert the coating form to a water-borne ones.

For example, Japanese Kokai Publication Sho-62-216671 proposes applying a resin particle-containing water-borne intermediate coating, applying a water-borne metallic coating, without curing the intermediate coating, and, after drying or curing, applying a clear coating. This technology, however, is not sufficient to obtain coating films capable of meeting the current high quality appearance requirement.

On the other hand, Japanese Kokai Publication Hei-09-235508 discloses a water-borne coating for a precoated metal as prepared by incorporating a mono- and/or polycarbodiimide compound in a water-borne coating containing, as a binder, an aqueous resin selected from among acrylic copolymer resins, polyester resins, polyurethane resins and modifications of these resins, each having carboxyl groups within the molecule and capable of being neutralized with a basic substance. This, however, is not satisfactory, from the appearance and performance characteristics viewpoint, in using for forming metallic coating films for automobiles.

SUMMARY OF THE INVENTION

Accordingly, the present invention has it for its object to provide a method of forming multilayer coating films having a high quality appearance while controlling the bleeding and inversion at the interface between the neighboring coating layers in applying a water-borne intermediate coating and a topcoat in that order to a substrate.

The present invention provides a method of forming coating films one after another on a substrate, namely forming an intermediate coating film using a water-borne intermediate coating, a metallic base coating film using a water-borne metallic base coating and a clear coating film using a clear coating,
wherein said water-borne intermediate coating and/or said water-borne metallic base coating contains a polycarbodiimide compound and a carboxyl-containing aqueous resin.

The invention also provides a method of forming coating films
wherein said polycarbodiimide compound is a carbodiimide compound modified for hydrophilicity obtainable by the step of reacting a polycarbodiimide compound (a) having at least two isocyanato groups within each molecule with a hydroxy-terminated polyol (b) in a mole ratio such that the number of moles of the isocyanato groups of the polycarbodiimide compound (a) is in excess of the number of moles of the hydroxy groups of the polyol (b) and
the step of reacting the reaction product obtainable in the preceding step with a modifier for hydrophilicity (c) having an active hydrogen atom and a hydrophilic moiety.

The invention further provides a method of forming coating films
wherein said polyol (b) has a number average molecular eight of 300 to 5,000 and
the modifier for hydrophilicity (c) is a monoalkoxypolyalkylene glycol with a monoalkoxy group containing 4 to 20 carbon atoms.

The invention still further provides a method of forming coating films
wherein the clear coating film formation with the clear coating is carried out without curing of the intermediate coating film and metallic base coating film.

Furthermore, the invention provides a multilayer coating film obtainable by any of the methods mentioned above. In the following, the present invention is described in further detail.

DETAILED DESCRIPTION OF THE INVENTION

Intermediate Coating Film

In the above coating film forming method of the invention, a water-borne intermediate coating is used for the formation of the intermediate coating film. This water-borne intermediate coating may contain a polycarbodiimide compound and a carboxyl-containing aqueous resin. For obtaining multilayer coating films having a good appearance, this water-borne intermediate coating should preferably contain a polycarbodiimide compound and a carboxyl-containing aqueous resin. In the following, the case of its containing a polycarbodiimide compound and a carboxyl-containing aqueous resin is mentioned.

The polycarbodiimide compound may be the product of any of various methods. Fundamentally, an isocyanato-terminated polycarbodiimide synthesized by the condensation reaction, accompanying carbon dioxide elimination, of an organic diisocyanate.

More specifically, there can be mentioned those polycarbodiimide compounds modified for hydrophilicity which are obtained, in the production of polycarbodiimide compounds, by the step of reacting a polycarbodiimide compound (a) having at least two isocyanato groups within each molecule with a hydroxy-terminated polyol (b) in a mole ratio such that the number of moles of the isocyanato groups of the polycarbodiimide compound (a) is in excess of the number of moles of the hydroxy groups of the polyol (b) and the step of reacting the reaction product obtained in the preceding step with a modifier for hydrophilicity (c) having an active hydrogen atom and a hydrophilic moiety.

In the above step of reacting a polycarbodiimide compound (a) having at least two isocyanato groups within each molecule with a hydroxy-terminated polyol (b), the polycarbodiimide compound (a) having at least two isocyanato groups within the molecule is not particularly restricted but, from the reactivity viewpoint, it is preferably a carbodiimide compound having an isocyanato group at both termini. The method of producing carbodiimide compounds having an isocyanato group at both termini is well known in the art and the condensation reaction of an organic diisocyanate under elimination of carbon dioxide can be utilized.

As the organic diisocyanate, there can be mentioned an aromatic diisocyanate, an aliphatic diisocyanate, an alicyclic diisocyanate, or a mixture of these. As specific examples, there may be mentioned 1,5-naphthylene diisocyanate, 4,4'-diphenylmethanediisocyanate, 4,4'-diphenyldimethylmethanediisocyanate, 1,3-phenylene diisocyanate, 1,4-phenylene diisocyanate, 2,4-tolylene diisocyanate, 2,6-tolylene diisocyanate, a mixture of 2,4- tolylene diisocyanate and 2,6-tolylene diisocyanate, hexamethylene diisocyanate, cyclohexane-1,4-diisocyanate, xylylene diisocyanate, isophoronediisocyanate, dicyclohexylmethane-4,4'-diisocyanate, methylcyclohexanediisocyanate, tetramethylxylylene diisocyanate and the like.

The above-mentioned condensation reaction is generally carried out in the presence of a carbodiimidation catalyst. As specific examples of the carbodiimidation catalyst, there may be mentioned phospholene oxides such as 1-phenyl-2-phospholene 1-oxide, 3-methyl-2-phospholene 1-oxide, 1-ethyl-2-phospholene 1-oxide, 3-methyl-1-phenyl-2-phospholene 1-oxide and 3-phospholene isomers of these, among others. From the reactivity viewpoint, however, 3-methyl-l-phenyl-2-phospholene 1-oxide is preferred.

The hydroxy-terminated polyol (b) to be used in the process for producing polycarbodiimide compounds modified for hydrophilicity is not particularly restricted but, from the reaction efficiency viewpoint, it is preferred that its number average molecular weight be 300 to 5,000. Specifically, such polyol (b) includes polyether diols, polyester diols and polycarbonate diols. Typical examples are polyalkylene glycols such as polyethylene glycol, polypropylene glycol, polyethylene-propylene glycol, polytetramethylene ether glycol, polyhexamethylene ether glycol and polyoctamethylene ether glycol, polyester diols such as polyethylene adipate, polybutylene adipate, polyhexamethylene adipate, polyneopentyl adipate, poly-3-methylpentyl adipate, polyethylene/butylene adipate and polyneopentyl/hexyl adipate, polylactone diols such as polycaprolactone diol, poly-3-methylvalerolactone diol, polycarbonate diols such as polyhexamethylene carbonate diol, and mixtures of these.

In the first step of the above process for producing polycarbodiimide compounds modified for hydrophilicity, the polycarbodiimide compound (a) having at least two isocyanato groups within each molecule is reacted with a hydroxy-terminated polyol (b) in a mole ratio such that the number of moles of the isocyanato groups of the polycarbodiimide compound (a) is in excess of the number of moles of the hydroxy groups of the polyol (b). When the number of moles of the isocyanato groups is equal to or smaller than the number of moles of the hydroxy groups, the reaction of the reaction product obtained in the first step with a modifier for hydrophilicity in the second step, which is to be mentioned below cannot be carried out to a sufficient extent. From the viewpoint of reaction efficiency and economy, the ratio between the number of moles of the isocyanato groups of the above polycarbodiimide compound (a) and that of the hydroxy groups of the polyol (b) is preferably 1.0:1.1 to 1.0:2.0. From the reaction efficiency viewpoint, the degree of polymerization of the polycarbodiimide compound (a) and polyol (b) in the reaction product obtained in this step is preferably 1 to 10.

The second step of the above process for producing polycarbodiimide compounds modified for hydrophilicity is a step of reacting the reaction product obtained in the above first step with a modifier for hydrophilicity (c) having an active hydrogen atom and a hydrophilic moiety.

As the modifier for hydrophilicity (c) having an active hydrogen atom and a hydrophilic moiety, there may be mentioned quaternary salts of dialkylamino alcohols represented by $(R_1)_2$—N—$R_2$—O—H (in which $R_1$ is a lower alkyl group and $R_2$ is an alkylene, polyalkylene or oxyalkylene group each having 1 to 10 carbon atoms), quaternary salts of dialkylaminoalkylamines represented by $(R_1)_2$—N—$R_2$—$NH_2$ (in which $R_1$ and $R_2$ are as defined above), alkylsulfonic acid salts containing at least one reactive hydroxy group and represented by H—O—$R_3$—$SO_3$—$R_4$ (in which $R_3$ is an alkylene group having 1 to 10 carbon atoms and $R_4$ is an alkali metal atom), monoalkoxy-polyalkylene glycols such as poly(ethylene oxide) or poly (propylene oxide) terminally blocked with a monoalkoxy group as represented by $R_5$—O—$(CH_2$—$CHR_6$—O—$)_m$—H (in which $R_5$ is an alkyl group having 1 to 20 carbon atoms, $R_6$ is a hydrogen atom or a methyl group and m is an integer of 4 to 30), and mixtures thereof, and the like.

From the viewpoint of water resistance of coating films obtained, monoalkoxy-polyalkylene glycols are preferred as the modifier for hydrophilicity (c). From the storage stability viewpoint, the number of carbon atoms contained in $R_5$ in the monoalkoxy-polyalkylene glycols is preferably 4 to 20, more preferably 8 to 12. From the viewpoint of water dispersibility, it is preferred that $R_6$ be a hydrogen atom. Furthermore, from the viewpoint of water dispersibility and reactivity after evaporation of water, the integer m is preferably 4 to 20, more preferably 6 to 12. The number of carbon atoms in $R_5$ and the value of m in the above unit can adequately be selected within the above respective ranges while taking into consideration the storage stability and water dispersibility and the reactivity after evaporation of water.

As the above monoalkoxy-polyalkylene glycols, there may specifically be mentioned, among others, poly (oxyethylene) monomethyl ether, poly(oxyethylene) mono-2-ethylhexyl ether and poly(oxyethylene) monolauryl ether.

In the second step of said process for producing polycarbodiimide compounds modified for hydrophilicity, the above reaction product is reacted with the above modifier for hydrophilicity (c) in a mole ratio such that the number of moles of the isocyanato groups of the above reaction product is equal to or in excess of the number of moles of the hydroxy groups of the modifier for hydrophilicity. When the number of moles of the isocyanato groups is smaller than the number of the hydroxy groups, the reaction of the above reaction product with the modifier for hydrophilicity cannot be carried out to a sufficient extent. The number of moles of the isocyanato groups in the above reaction product can be directly determined by assaying, or the calculated value based on the formulation in the first step may be employed.

In the first and/or second step, a catalyst may be used. The temperature in the above-mentioned reactions is not restricted but, from the viewpoint of reaction system control and reaction efficiency, a temperature of 60 to 120 °C. is preferred. In the above reactions, an active hydrogen-free organic solvent is preferably used.

By the above first step and second step, it is possible to obtain polycarbodiimide compounds modified for hydrophilicity.

In a preferred embodiment of the invention, the polycarbodiimide compound modified for hydrophilicity, which is preferably contained in the water-borne intermediate coating to be used in the practice of the present invention, is a product in which a carbodiimide unit and a polyol unit occur alternately via a urethane bond and repeatedly and a monoalkoxypolyalkylene oxide unit occurs as both molecular termini and is bound to a carbodiimide unit via a urethane bond.

The carbodiimide unit mentioned above is obtained from a polycarbodiimide compound (a) having at least two isocyanato groups within each molecule by removal of the isocyanato groups and is a unit represented by (—N=C=N—$R_7$—$)_n$— (in which $R_7$ is a saturated or unsaturated hydrocarbon group, which may optionally contain a nitrogen atom and/or an oxygen atom and n means the degree of polymerization and is a natural number of 1 to 20).

Said polycarbodiimide compound (a) is the same as that mentioned hereinabove with respect to the method of producing the polycarbodiimide modified for hydrophilicity.

The polyol unit mentioned above is obtained from (b) the hydroxy-terminated polyol by removal of the active hydrogen atoms.

The polyol (b) is the same as that mentioned above with respect to the process for producing the polycarbodiimide compound modified for hydrophilicity.

In the polycarbodiimide compound modified for hydrophilicity according to the invention, the above carbodiimide unit and polyol unit occur alternately via a urethane bond represented by —NH—CO— and repeatedly. The number of the repetitions is not restricted but, from the reaction efficiency viewpoint, it is preferably 1 to 10.

In a preferred embodiment of the invention, the polycarbodiimide compound modified for hydrophilicity according to the invention has a monoalkoxy polyalkylene oxide unit at both molecular termini thereof, and the monoalkoxy polyalkylene oxide unit is bound to the above carbodiimide unit via the above urethane bond.

The monoalkoxy polyalkylene oxide unit mentioned above is obtained from the above monoalkoxy polyalkylene glycol by removal of the active hydrogen atoms and represented by $R_5$—O—(CH$_2$—CHR$_6$—O—)$_m$— (in which $R_5$, $R_6$ and m are as defined above).

The monoalkoxypolyalkylene glycol is specifically the same as that mentioned above with respect to the process for producing the polycarbodiimide compound modified for hydrophilicity.

The carboxyl-containing aqueous resin to be contained in the intermediate coating is one generally used as a binder component for aqueous resins but is not particularly restricted. Such resin may be water-soluble or water-dispersible and includes, for example, carboxyl-containing acrylic resins, carboxyl-containing polyester resins, carboxyl-containing alkyd resins and carboxyl-containing polyurethane resins. These aqueous resins are commercially available or can be produced by the methods well known in the art. The carboxyl-containing aqueous resin to be contained in the above intermediate coating may comprise a combination of two or more species.

The carboxyl-containing aqueous resin, when it is water-soluble, generally has a carboxyl group-due resin solid acid value of 20 to 200 and, when it is water-dispersible, a carboxyl group-due resin solid acid value of 3 to 30 although these factors vary depending on the resin species and molecular weight. In the present specification, the term "aqueous" means both water-soluble and water-dispersible.

The mole ratio between the total number of carboxyl groups contained in the water-borne intermediate coating to be used in the practice of the invention and the total number of carbodiimide groups in the above polycarbodiimide compound is 1:0.05 to 1:3, preferably 1:0.1 to 1:2. When the mole ratio of the carboxyl groups is less than 0.05, the reaction cannot proceed to a sufficient extent, so that the physical properties of the coating film obtained will be poor. When it is in excess of 3, any extra effect proportional to the amount used will not be obtained.

On the other hand, in cases where said water-borne intermediate coating does not contain any polycarbodiimide compound or any carboxyl-containing aqueous resin, the composition may contain some other curing agent, which is to be mentioned later herein, in lieu of the polycarbodiimide compound and a coating film-forming resin, such as an acrylic resin, polyester resin, alkyd rein, epoxy resin or urethane resin, in lieu of the carboxyl-containing aqueous resin.

The water-borne intermediate coating may contain, if necessary, in addition to the carboxyl-containing aqueous resin and polycarbodiimide compound, one or more additives selected from among color pigments, other curing agents, viscosity modifiers, curing catalysts, surface modifiers, antifoaming agents, pigment dispersants, plasticizers, film forming aids, ultraviolet absorbers, antioxidants and so forth.

As the color pigments, there maybe mentioned, for example, organic ones such as azo chelate pigments, insoluble azo pigments, condensed azo pigments, phthalocyanine pigments, indigo pigments, perinone pigments, perylene pigments, dioxane pigments, quinacridone pigments, isoindolinone pigments and metal chelate pigments, and inorganic ones such as chrome yellow, yellow iron oxide, red iron oxide, carbon black and titanium dioxide. As extender pigments, there may be mentioned calcium carbonate, barium sulfate, clay, talc and the like. Flat pigments such as aluminum powder and mica powder may also be added.

As a standard formulation, a gray intermediate coating containing carbon black and titanium dioxide as main pigments is used. Furthermore, the so-called color intermediate coating in which the hue for the top coat is matched with set gray or various color pigments are used combinedly.

The other curing agent mentioned above can be selected, according to the functional group(s) contained in the above carboxyl-containing resin, from among various ones well known in the art. For example, when the above carboxyl-containing resin has a hydroxy group(s), amino resins such as melamine resins and benzoguanamine resins, isocyanate compounds such as trimethylene diisocyanate, hexamethylene diisocyanate, xylylene diisocyanate and isophoronediisocyanate, and blocked isocyanates which are blocked nurate forms, and, further, aliphatic polybasic carboxylic acids and epoxy resins, among others. These may be used singly or two ore more of them may be used combinedly. From the viewpoint of performance characteristics cost of product coating films, amino resins and/or blocked isocyanates are generally used.

The mixing ratio between the carboxyl-containing resin and curing agent in the water-borne intermediate coating composition can be arbitrarily selected by a skilled person in the art according to the coating storage stability and coating film performance characteristics.

In said water-borne intermediate coating, there may be incorporated some other viscosity modifier for preventing bleeding with the top coat film and securing the workability in coating application. Substances showing thixotropy can generally be used as the viscosity modifier, for example crosslinked or uncrosslinked resin particle, swollen and dispersed fatty acid amides, fatty acid amides, long-chain polyaminoamide phosphate salts and like polyamides, colloidal swollen and dispersed polyethylene oxide and like polyethylene type ones, organic acid smectite clay, montmorillonite and like organic bentonites, inorganic pigments such as aluminum silicate and barium sulfate, and flat pigments causing viscosity owing to their shape.

Said water-borne intermediate coating includes those generally called water base primers (sealers).

The method of producing the coating composition to be used according to the invention, inclusive of those to be mentioned later, is not particularly restricted but all methods well known in the art, for example the method comprising dispersing a pigment and/or like ingredient by kneading on a kneader, roll or the like, can be employed.

Metallic Coating Film

In the coating film forming method of the invention, the metallic coating film is composed of a metallic base coating film formed from a water-borne metallic base coating and a clear coating film formed from a clear coating.

Metallic Base Coating Film

The water-borne metallic base coating for forming the above metallic base coating film may contain a polycarbodiimide compound and a carboxyl-containing aqueous resin. For obtaining multilayer coating films having a good appearance, it is preferred that this water-borne metallic base coating contain a polycarbodiimide compound and a carboxyl-containing aqueous resin. In addition, it contains a color pigment and a luster color pigment, among others, which are contained in metallic base coatings in general.

The polycarbodiimide compound, carboxyl-containing aqueous resin and color pigment may be the same as those mentioned above in relation to said water-borne intermediate coating. In cases where the water-borne metallic base coating does not contain any polycarbodiimide compound or carboxyl-containing aqueous resin, it contains the other curing agent and film forming resin respectively mentioned hereinabove in the description of the water-borne intermediate coating.

The mole ratio between the total number of the carboxyl groups of the resin and the total number of the carbodiimide groups of the polycarbodiimide compound both contained in the water-borne metallic base coating is 1:0.05 to 1:1.5, preferably 1:0.1 to 1:1.3. When the mole ratio of the carboxyl groups is smaller than 0.05, the reaction does not proceed to a sufficient extent, so that the physical properties of the coating film obtained will be lowered. When it is in excess of 1.5, any extra effect cannot be obtained in proportion to the amount used.

The luster color pigment to be contained in the above metallic base coating is not particularly restricted in shape but may be a colored one. Preferably, it has a mean particle size ($D_{50}$) of 2 to 50 $\mu$m and a thickness of 0.1 to 5 $\mu$m. Those whose mean particle size is within the range of 10 to 35 $\mu$m are excellent in feel of glitter, hence are more preferred.

Generally, the luster color pigment concentration (PWC) in the above coating is preferably not more than 18.0%. When the upper limit is exceeded, the coating appearance becomes poor. A more preferred range is 0.01% to 15.0%, still more preferably 0.01% to 13.0%.

As the luster color pigment, there may be mentioned colorless or colored metallic luster color pigments, such as aluminum, copper, zinc, iron, nickel, tin, aluminum oxide and like metals and alloys of these, and mixtures thereof. Further, interfering mica pigments, white mica pigments, graphite pigments, other colored or color flat pigments and so on may be used combinedly.

The total pigment concentration (PWC), inclusive of the above luster color pigment and other all pigments, in the coating is preferably 0.1% to 50%, more preferably 0.5% to 40%, still more preferably 1.0% to 30%. When the upper limit is exceed, the coating film appearance may deteriorate.

The total solid content in the above water-borne metallic base coating is preferably 15 to 50% by weight, more preferably 18 to 45%. When it is above the upper limit or below the lower limit, the coating stability decreases. When it is in excess of the upper limit, the viscosity is too high, and the coating film appearance may deteriorate. When it is below the lower limit, the viscosity is too low and defects in appearance such as bleeding and mottle may readily appear.

For securing the workability in application, a viscosity modifier is preferably added to the above metallic base coating. The viscosity modifier is used to form good coating films without mottle or sagging and may be a substance generally showing thixotropy. As such substance, use may be made, for example, of those mentioned above in the description of the water-borne intermediate coating.

The above water-borne metallic base coating may containing a phosphate ester containing a long-chain alkyl group having 8 to 18 carbon atoms and having an HLB value of 3 to 12 as a corrosion inhibitor for the metallic luster color pigment, when used, or for improving the wettability with the coating film and improving the adhesion thereto. When the number of carbon atoms is less than 8, the wettability with the coating film may deteriorate and, when it is in excess of 18, the compound may crystallize in the coating, causing troubles. A more preferred number of carbon atoms is 10 to 14 and, in that case, the wettability becomes still better and the adhesion is improved. The above compound preferably has an HLB value of 4to8. The HLB value can be calculated using Griffin's equation based on the weight fraction: HLB=20×(MH/M) [wherein MH means the molecular weight of the hydrophilic group moiety and M means the molecular weight of the active agent]. As the molecular weight of the hydrophilic group moiety, the molecular weights of phosphate esters, sulfonic acids and carboxylic acids were used. Outside the above range, a decrease in wettability unfavorably results.

As preferred compounds, there may be mentioned 2-ethylhexyl acid phosphate, mono- or di-diisodecyl acid phosphate, mono- or di-tridecyl acid phosphate, mono- or di-lauryl acid phosphate, mono- or di-nonylphenyl acid phosphate and the like.

The addition amount of the above component is preferably 0.1 to 5% by weight, more preferably 0.2 to 2% by weight, relative to the total amount of resin solids. When it is less than the lower limit, the adhesion decreases. When it is in excess of the upper limit, the water resistance decreases to the contrary.

In the water-borne metallic base coating to be used according to the invention, there may be incorporated, in addition to the above ingredients, one or more of additives added to coatings in general, for example surface modifiers, viscosity modifiers, antioxidants, ultraviolet absorbers, antifoaming agents and so on. The addition amount of these are publicly known in the art.

Clear Coating Film

The clear coating for forming the clear coating film is not particularly restricted but may be a clear coating containing a film forming resin and a curing agent, among others. The form of the clear coating which can adequately be used includes the solvent-borne type, water-borne type and powder type.

As preferred examples of the solvent-borne clear coating, there may be mentioned, from the viewpoint of transparency or resistance to acid etching, for instance, combinations of an acrylic resin and/or polyester resin and an amino resin and/or isocyanate, and an acrylic resin and/or polyester resin having a carboxylic acid-epoxy curing system.

As examples of the water-borne clear coating, there may be mentioned those containing a resin obtained from a film forming resins, which is included among the ones mentioned above as examples of the solvent-borne clear coating, by neutralization with a base for rendering it aqueous. This neutralization may be conducted, before or after polymerization, by adding a tertiary amine such as dimethylethanolamine or triethylamine.

On the other hand, the power type clear coating can be obtained by using an ordinary powder coating such as a thermoplastic or thermosetting powder coating. For obtaining coating films with good physical properties, a thermosetting powder coating is preferred. As typical examples of the thermosetting powder coating, there may be mentioned epoxy, acrylic and polyester-based powder clear coatings. Acrylic powder clear coatings are much more preferred because of their good weathering resistance.

In the above clear coating, there may be incorporated a viscosity modifier for securing the workability in application, as in the case of the above intermediate coating. The clear coating may further contain a curing catalyst or surface modifier, among others, if necessary.

The thickness of the clear coating film may vary according to the intended use but, in many cases, a thickness of 10 to 80 μm is useful. When it is in excess of the upper limit, the image sharpness may deteriorate or such a trouble as mottle, pinhole formation or running may arise. When it is below the lower limit, the substrate cannot be hidden, and the coating film appearance may deteriorate.

Substrate

The coating film forming method of the invention can advantageously be applied to various substrates such as metals, plastics and foamed bodies.

As the metal products, there may be mentioned, among others, iron, copper, aluminum, tin, zinc and the like and alloys containing these metals. Specifically, mention may be made of bodies and parts of automobiles such as passenger cars, trucks, motorcycles and buses. In the case of these metal substrates, it is particularly preferred that they be preliminarily subjected to chemical conversion treatment with a phosphate salt, a chromate salt or the like. Further, it is possible to form an electrodeposited coating film on steel panels after chemical conversion treatment using a cationic or anionic electrodeposition coating. A cationic electrodeposition coating is preferred, however, since it gives multilayer coating film excellent in corrosion resistance.

As the above plastics products, there may be mentioned polypropylene resins, polycarbonate resins, urethane resins, polyester resins, polystyrene resins, ABS resins, vinyl chloride resins, polyamide resins and the like. Specifically, mention may be made of automotive parts such as spoilers, bumpers, mirror covers, grilles and doorknobs, and the like. Further, these plastic products are preferably ones washed by vapor cleaning with trichloroethane or by using a neutral detergent. They may further be coated with a primer for enabling electrostatic coating.

Method of Forming Coating Films

According to the coating film forming method of the invention, an intermediate coating film is formed on the substrate using a water-borne intermediate coating, then a metallic base coating film is formed using a water-borne metallic base coating and a clear coating film is formed using a clear coating in that order. It is preferred that both the water-borne intermediate coating and water-borne metallic base coating contain a polycarbodiimide compound and a carboxyl-containing aqueous resin.

In cases where the water-borne intermediate coating is applied to automotive bodies according to the coating film forming method of the invention, techniques comprising multistage, preferably two-stage, application by air-electrostatic spray coating, or techniques using a combination of air-electrostatic spray coating and a rotatry spraying type electrostatic coating machine popularly called "μμ (micromicro) bell", "μ (micro) bell" or "metabell", for instance, may be mentioned as coating film forming techniques for attaining high quality appearance.

In the coating film forming method of the invention, the thickness of the coating film in the step of application of the water-borne intermediate coating varies according to the intended use. In many cases, however, a thickness of 10 to 60 μm is useful. When it is above the upper limit, the image sharpness may deteriorate or a trouble such as mottle or running may occur at the time of application. When it is below the lower limit, the substrate cannot be masked, and the coating film appearance may deteriorate.

According to the coating film forming method of the invention, a water-borne metallic base coating is further applied to the intermediate coating film to form a metallic base coating film thereon.

The formation of a metallic base coating film according to the invention is carried out by applying the water-borne metallic base coating by air-electrostatic spray coating or using a rotary spraying type electrostatic coating machine such as a μμ bell or μ bell, in the same manner as in the intermediate coating. The dry coating film thickness can be selected within the range of 10 to 30 μm.

Further, in the coating film forming method of the invention, a clear coating film applied after the formation of said metallic base coating film is formed for the purpose of smoothing the unevenness or glittering due to the luster color pigment contained in the metallic base coating film and protecting the film. As the specific technique of application, the one comprising forming coating films using a rotary spraying type electrostatic coating machine such as mentioned above, for example a μμ bell or μ bell is preferred.

The dry film thickness of the clear coating film formed by said clear coating is in general preferably about 10 to 80 μm, more preferably about 20 to 60 μm. When it is in excess of the upper limit, such a trouble as foaming or sagging may occur. When it is below the lower limit, the unevenness of the substrate cannot be masked.

The coating films obtained in the above manner may be cured following the formation of each coating film layer. It is preferred, however, that the consecutive two layers be formed in the so-called wet-on-wet manner. Furthermore, it is particularly preferred that the coating film formation is carried out by the so-called three-coat one-bake technique comprising forming the clear coating film without curing the intermediate coating film and metallic base coating film and curing the thus-multilayer coating films simultaneously. In this case, the stoves can partly be omitted, which is favorable from the economy and environmental viewpoint as well. For obtaining well finished coating films, it is desirable that the above intermediate coating film and metallic base coating film be preheated at 40 to 100° C. for 2 to 10 minutes after formation of each coating film.

By selecting the curing. temperature for curing coating films after application of the above clear coating within the range of 80 to 180° C., preferably 120 to 160° C., it is possible to obtained cured coating films with a high crosslink density. When the curing temperature is higher than the upper limit, the coating films become hard and brittle. When it is lower than the lower limit, the degree of curing is insufficient. While the curing time varies depending on the curing temperature, a curing time of 10 to 30 minutes is adequate when the curing temperature is 120° C. to 160° C.

The thickness of the multilayer coating film formed according to the invention is, in many instances, 30 to 300 μm, preferably 50 to 250 μm. When it is in excess of the upper limit, the physical properties of the film, such as those found in a thermal shock cycle test, deteriorate. When it is below the lower limit, the strength of the film itself decreases.

By the method of the invention, it is now possible to provide, on a commercial scale, multilayer coating films having a high quality appearance while controlling interfacial bleeding or inversion between coating film layers otherwise found when a water-borne intermediate coating film and a water-borne metallic coating film are formed in that order. This is probably due to the use of those polycarbodiimide compound and carboxyl-containing aqueous resin in the water-borne intermediate coating and/or water-borne metallic base coating which readily react upon heating at low temperatures, for example under preheating conditions, leading to an increased coating film surface hardness and facilitating the interfacial control with the coating film formed thereon.

BEST MODES FOR CURRYING OUT THE INVENTION

The following examples illustrate the present invention in detail. They are, however, by no means limitative of the scope of the invention. In the following, "part(s)" means "part(s) by weight".

Production Example
Production of a Modified Carbodiimide Compound 4,4-Dicyclohexylmethanediisocyanate (700 parts) and 14 parts of a carbodiimidating catalyst (3-methyl-1-phenyl-2-phospholene 1-oxide) were heated at 180° C. for 16 hours, to give isocyanato-terminated 4,4-dicyclohexylmethanecarbodiimide (carbodiimide group content: 4 equivalents). Then, 226.8 parts of the carbodiimide obtained was dissolved in 106.7 parts of N-methylpyrrolidone with heating at 90° C. Then, 200 parts of polypropylene glycol (number average molecular weight: 2,000) was added and the mixture was stirred at 40° C. for 10 minutes, 0.16 part of dibutyltin dilaurate was added, the temperature was again raised to 90° C. and the reaction was allowed to proceed at that temperature for 3 hours. Further, 96.4 parts of poly (oxyethylene) mono-2-ethylhexyl ether having 8 oxyethylene units was added, the reaction was allowed to proceed at 100° C. for 5 hours, and 678.1 parts of deionized water was added at 50° C. to give an aqueous dispersion of a carbodiimide compound modified for hydrophilicity with a resin solid content of 40% by weight.

Production of an Aqueous Dispersion of a Carboxyl-containing Acrylic Resin

A reaction vessel was charged with 126.5 parts of deionized water and the temperature was raised to 80° C. with stirring in a nitrogen atmosphere. Then, a monomer emulsion composed of 45.21 parts of methyl acrylate, 27.37 parts of ethyl acrylate, 7.42 parts of 2-hydroxyethyl methacrylate, 0.5 part of Aqualon HS-10 (polyoxyethylene alkylpropenylphenyl ether sulfate ester, product of Daiichi Kogyo Seiyaku), 0.5 part of Adeka Reasoap NE-20 (α-[1-[(allyloxy)methyl]-2-(nonylphenoxy)ethyl]-ω-hydroxyoxyethylene, product of Asahi Denka, 80% aqueous solution) and 80 parts of deionized water, as the first stage monomer mixture, and an initiator solution composed of 0.24 part of ammonium persulfate and 10 parts of deionized water were added dropwise in parallel into the reaction vessel over 2 hours. After completion of the dropping, the mixture was matured at the same temperature for 1 hour.

Further, a monomer emulsion composed of 15.07 parts of ethyl acrylate, 1.86 parts of 2-hydroxyethyl methacrylate, 3.07 parts of methacrylic acid, 0.2 part of Aqualon HS-10 and 10 parts of deionized water, as the second stage monomer mixture, and an initiator solution composed of 0.06 part of ammonium persulfate and 10 parts of deionized water were added dropwise in parallel into the reaction vessel over 0.5 hour. After completion of the dropping, the mixture was matured at the same temperature for 2 hours.

Then, the mixture was cooled to 40° C. and passed through a 400 mesh filter and adjusted to pH 7.0 by adding 167.1 parts of deionized water and 0.32 part of dimethylaminoethanol, to give an aqueous dispersion of a carboxyl-containing acrylic resin with a mean particle size of 150 nm, a nonvolatile matter content of 20%, a solid matter acid value of 20 mg KOH/g and a hydroxyl value of 40 mg KOH/g.

Production of a Carboxyl-containing Acrylic Resin

A one-liter reaction vessel equipped with a nitrogen inlet tube, stirrer, temperature controller, dropping funnel and condenser was charged with 76 parts of ethylene glycol monobutyl ether. A monomer solution was separately prepared by mixing up 15 parts of styrene, 63 parts of methyl methacrylate, 48 parts of 2-hydroxyethyl methacrylate, 117 parts of n-butyl acrylate, 27 parts of methacrylic acid, 30 parts of acrylamide and 3 parts of azobisisobutyronitrile. A 61-part portion of this monomer solution was added to the reaction vessel and the temperature was raised to 120° C. with stirring. Then, 242 parts of the monomer solution was added over 3 hours and thereafter stirring was continued for 1 hour, to give a carboxyl-containing acrylic resin with a number average molecular weight of 12,000, a hydroxyl value of 70 mg KOH/g and an acid value of 58 mg KOH/g. Then, 28 parts of diethanolamine and 200 parts of deionized water were added to give a transparent and viscous carboxyl-containing acrylic resin varnish with a nonvolatile matter content of 50%.

Production of a Maleic Anhydride-modified Chlorinated Polypropylene Emulsion

A one-liter reaction vessel equipped with a nitrogen inlet tube, stirrer, temperature controller, dropping funnel and condenser was charged with 233 parts of Hardlen M128P (maleic anhydride-modified chlorinated polypropylene, chlorine content: 21%, weight average molecular weight: 40,000, product of Toyo Kasei Kogyo), 59 parts of Emulgen 920 (nonylphenyl polyoxyethylene ether, product of Kao Corp.), 62 parts of Solvesso 100 (aromatic hydrocarbon solvent, product of Exxon) and 27 parts of carbitol acetate, and after 1 hour of heating at 110° C. for effecting dissolution, the mixture was cooled to 100° C. and a solution of 5 parts of dimethylaminoethanol in 619 parts of deionized water was added dropwise over 1 hour for effecting emulsification by phase inversion. After cooling, the emulsion was filtered through a 400 mesh net, to give a maleic anhydride-modified chlorinated polypropylene emulsion resin with a nonvolatile matter content of 30.5% by weight and a mean particle size of 0.1 μm as determined by the laser beam scattering method.

Production of a Carboxyl-containing Aqueous Alkyd Resin

A reaction vessel equipped with a stirrer, nitrogen inlet tube, temperature controlling device, condenser and fractionating column was charged with 155 parts of coconut oil, 248 parts of trimethylolpropane and 1.7 parts of dibutyltin oxide, and heating was started under dry nitrogen and, after dissolution of the raw materials, the temperature was raised gradually to 210° C. for effecting transesterification, followed by cooling. Then, 267 parts of isophthalic acid, 59 parts of adipic acid, 33 parts of neopentyl glycol and 41 parts of Epol (hydrogenated polyisoprene diol, molecular weight 1,860, product of Idemitsu Petrochemical) were added and the temperature was gradually raised to 220° C. for effecting dehydration esterification. After allowing the dehydration esterification reaction to proceed until a resin acid value of 10 mg KOH/g, the reaction mixture was cooled to 150° C., 40 parts of trimellitic anhydride was added and the reaction was allowed to proceed until a resin acid value of 40 mg KOH/g, the reaction mixture was cooled to 140° C., 77 parts of ε-caprolactone was further added and the reaction was allowed to proceed for 1 hour. The reaction procedure was thus finished. To the alkyd resin were added 75 parts of Solvesso 150 (aromatic hydrocarbon solvent, product of Esso Chemical) and 75 parts of butyl cellosolve, to give an alkyd resin with a solid content of 83% by weight, a solid matter acid value of 37 mg KOH/g and a number average molecular weight of 2,850.

To 100 parts of this alkyd resin were added 0.41 part of calcium hydroxide and 4.42 parts of triethylamine and, after mixing, 191.6 parts of deionized water was added, to give a carboxyl-containing aqueous alkyd resin varnish with a solid content of 28% by weight.

Production of a Solvent-borne Clear Coating E-1

(1) Production of a Varnish

A reaction vessel equipped with a nitrogen inlet tube, stirrer, temperature controller, dropping funnel and condenser was charged with 70 parts of xylene and 20 parts of n-butanol. A monomer solution was separately prepared by mixing up 1.2 parts of methacrylic acid, 26.4 parts of styrene, 26.4 parts of methyl methacrylate, 10.0 parts of 2-hydroxyethyl methacrylate, 36.0 parts of n-butyl acrylate and 1.0 part of azobisisobutyronitrile. A 20-part portion of this monomer solution was added to the reaction vessel and the temperature was raised with stirring. The remaining 81 parts of the monomer solution was added dropwise over 2 hours under reflux and then an initiator solution composed of 0.3 part of azobisisobutyronitrile and 10 parts of xylene was added dropwise over 30 minutes. The reaction mixture was further refluxed for 2 hours with stirring. The reaction procedure was thus finished to give an acrylic resin varnish with a nonvolatile matter content of 50%, a number average resin molecular weight of 8,000, an acid value of 8 mg KOH/g and a hydroxyl value of 48 mg KOH/g.

(2) Production of a Polyester Resin

A two-liter reaction vessel equipped with a nitrogen inlet tube, stirrer, temperature controller, condenser and decanter was charged with 134 parts of bishydroxyethyltaurine, 130 parts of neopentyl glycol, 236 parts of azelaic acid, 186 parts of phthalic anhydride and 27 parts of xylene and the temperature was raised. The water formed by the reaction was removed by azeotropic distillation with xylene. The temperature was raised to 190° C. over about 2 hours from the start of refluxing and the stirring and dehydration were continued until attainment of a carboxylic acid equivalent acid value of 145 and then the mixture was cooled to 140° C. While the temperature of 140° C. was maintained, 314 parts of Cardura E10 (glycidyl versatate, product of Shell) was added dropwise over 30 minutes and, thereafter, the reaction was continued for 2 hours with stirring and the reaction was then finished. The polyester resin obtained had a number average molecular weight of 1,054, an acid value of 59 mg KOH/g and a hydroxyl value of 90 mg KOH/g.

(3) Production of Resin Particles

A one-liter reaction vessel equipped with a nitrogen inlet tube, stirrer condenser and temperature controller was charged with 282 parts of deionized water, 10 parts of the polyester produced as mentioned above under (2) and 0.75 part of diethanolamine, and dissolution was effected with stirring while maintaining the temperature at 80° C. Thereto was added an initiator solution prepared by dissolving 45 parts of azobiscyanovaleric acid in 45 parts of deionized water plus 4.3 parts of dimethylethanolamine. Then, a monomer solution composed of 70.7 parts of styrene, 70.7 parts of methyl methacrylate, 94.2 parts of n-butyl acrylate, 30 parts of 2-hydroxyethyl acrylate and 4.5 parts of ethylene glycol dimethacrylate was added dropwise to the reaction vessel over 1 hour. After dropping, an initiator solution prepared by dissolving 1.5 parts of azobiscyanovaleric acid in 15 parts of deionized water plus 1.4 parts of dimethylethanolamine was added, and the mixture was stirred at 80° C. for 1 hour. As a result, an emulsion was obtained which had a nonvolatile matter content of 45%, a pH of 7.2, a viscosity of 92 cps (25° C.) and a particle size of 0.156 μm. This emulsion was spray-dried for removing the water and 200 parts of xylene was added to 100 parts of the resin particles obtained for effecting redispersion, whereby a xylene dispersion of the resin particles was prepared. The particle size was 0.3 μm.

(4) Production of Solvent-borne Clear Coating E-1

In a stainless steel vessel, there were placed 100 parts of the varnish produced as mentioned above under (1), 38 parts of U-Van 20SE-60 (butylated melamine resin, product of Mitsui Toatsu), 0.5 part of Modaflow (surface modifier, product of Monsanto) and 2.2 parts of the resin particles produced as mentioned above under (3). The mixture was stirred using an experimental stirrer to give a solvent-borne clear coating E-1.

Production of Solvent-borne Clear Coating E-2

In a stainless steel vessel, there were placed 100 parts of the varnish produced as mentioned above in the production of solvent-borne clear coating E-1 (1), 8.3 parts of Sumidur 3500 (isocyanurate resin, product of Sumitomo Bayer), 0.5 part of Modaflow (surface modifier, product of Monsanto) and 2.2 parts of the resin particles produced as mentioned above under (3). The mixture was stirred using an experimental stirrer to give a solvent-borne clear coating E-2.

Water-borne Intermediate Coating A-1

A 1,000-mL stainless steel vessel was charged with 76 parts of the carboxyl-containing acrylic resin varnish obtained in the above production example, 190 parts of Titan R-820 (white pigment, product of Ishihara Sangyo), 0.5 part of Mitsubishi Carbon MA-100 (black pigment, product of Mitsubishi Chemical) and 76 parts of deionized water, and dispersion was effected by stirring the mixture at room temperature for 45 minutes using a coating conditioner, to give a gray pigment paste.

To this were added 95 parts of the above carboxyl-containing acrylic resin varnish, 285 parts of the previous aqueous dispersion of the carboxyl-containing acrylic resin and 177.7 parts of the modified carbodiimide compound. The mixture was further stirred for 30 minutes using a labo mixer to give a gray water-borne. intermediate coating A-1.

Water-borne Intermediate Coating A-2

(1) Production of a Pigment Dispersion Paste in an Aqueous Alkyd Resin

A vessel equipped with a stirrer was charged, with stirring, with 360 parts of the carboxyl-containing aqueous alkyd resin of the previous production example, 45 parts of Surfynol CT324 (acetylene type pigment wetting agent, product of Air Products), 7 parts of Foamaster S (silicone antifoaming agent, product of Henkel), 249 parts of deionized water, 25 parts of Ketjen Black EC600JD (conductive carbon pigment, product of Lion Corp.) and 314 parts of Ti-Pure R960 (titanium oxide pigment, product of du Pont), in that order. After 1 hour of stirring, dispersion was effected on a 1.4-liter Dyno mill for laboratory use until a size of 20 μm. The gray aqueous alkyd resin pigment dispersion paste had a nonvolatile matter content of 54% by weight.

(2) Production of a Coating

The previous maleic anhydride-modified chlorinated polypropylene emulsion resin (243 parts), 320 parts of the previous aqueous alkyd resin pigment paste dispersion, 63 parts of the previous modified carbodiimide compound, 3 parts of Polyflow KL245 (silicone surface modifier, product of Kyoei Kagaku), 349 parts of deionized water, 2 parts of dimethylaminoethanol and 20 parts of Primal ASE60 (alkali swelling thickening agent, product of Rohm & Haas) were charged in that order with stirring and the mixture was stirred for 1 hour to give a water-borne intermediate coating A-2.

Water-borne Intermediate Coating B-1

A water-borne intermediate coating B-1 was prepared in the same manner as above except that a melamine resin "Cymel 303" (methoxylated methylolmelamine, product of Mitsui Cytec) was used in lieu of the modified carbodiimide compound used in the production of water-borne intermediate coating A-1.

Water-borne Metallic Base Coating C-1

Alpaste 7160N (15 parts; aluminum pigment paste, aluminum content 65%, product of Toyo Aluminum) and 2 parts of lauryl acid phosphate were homogeneously dispersed in 119 parts of the carboxyl-containing acrylic resin varnish obtained in the previous production example and 40 parts of the modified carbodiimide compound and, then, 100 parts of deionized water was added with stirring, 356 parts of aqueous dispersion of the previous carboxyl-containing acrylic resin was further added and homogeneous dispersion was effected, to give a water-borne metallic base coating C-1.

Water-borne Metallic Base Coating D-1

To 112 parts of the carboxyl-containing acrylic resin varnish obtained in the previous coating film forming resin production 1 were added 15 parts of Alpaste 7160N (aluminum pigment paste, aluminum content 65%, product of Toyo Aluminium) and 30 parts of Cymel 303 (methoxylated methylolmelamine, product of Mitsui Cytec), and uniform mixing was effected. Further, 2 parts of lauryl acid phosphate was added and, after homogeneous dispersion was realized, 47 parts of the aqueous dispersion of the previous carboxyl-containing acrylic resin particle was added and homogeneous dispersion was further effected to give a water-borne metallic base coating D-1.

EXAMPLE 1

A cationic electrodeposition coating "Power-Top U-50, product of Nippon Paint) was electrodeposited, to a dry film thickness of 20 µm, on zinc phosphate-treated dull steel panels (thickness: 0.8 mm, length: 30 cm, width: 40 cm) and baked at 160° C. for 30 minutes. To the thus-prepared substrates was applied a dilution of the water-borne intermediate coating A-1 of the previous production example (diluted with deionized water to a viscosity of 40 seconds (No. 4 Ford cup, 20° C.)) to a dry film thickness of 35 µm in two stages by an air sprayer. Between the two applications, there was a one-minute interval for setting. The second application was followed by a 5-minute interval for setting. Thereafter, preheating was carried out at 80° C. for 5 minutes.

Then, a dilution of the water-borne metallic coating C-1 of the previous production example (diluted with deionized water to a viscosity of 30 seconds (No. 4 Ford cup, 20° C.)) was applied to a dry film thickness of 20 µm in two stages by air spraying. Between the two applications, there was a one-minute interval for setting. The second application was followed by a 5-minute interval for setting. Thereafter, preheating was carried out at 80° C. for 5 minutes.

After preheating, the coated sheets were allowed to cool to room temperature, and the solvent-borne clear coating E-1 of the previous production example was applied in one stage to a dry film thickness of 40 µm, followed by 7 minutes of setting. The coated sheets were then baked in a drier at 140° C. for 30 minutes.

The coated sheets obtained were measured and evaluated for appearance using a portable sharpness/gloss meter PGD-IV (surface shape measuring apparatus, product of Tokyo Koden).

Separately, the coated sheets obtained were immersed in warm water at 40° C. for 10 days, then washed and allowed to stand for 1 hour, and the coating films were evaluated for their state by the eye.

Evaluation Criteria

⊙: No abnormality

◯: Slight matting

Δ: Matting and blistering

X: Matting and blistering in a very large number of places.

The results obtained in the above evaluations are shown in Table 1.

EXAMPLE 2

A dilution of the water-borne intermediate coating A-2 of the previous production example (diluted with deionized water to a viscosity of 40 seconds (No. 4 Ford cup, 20° C.)) to polypropylene substrates (size: 70 mm×260 mm×3 mm) degreased with a neutral detergent to a dry film thickness of 10 µm by airspraying. After a 5-minute interval following application, preheating was carried out at 80° C. for 10 minutes.

After cooling, a dilution of the water-borne metallic coating C-1 of the previous production example (diluted with deionized water to a viscosity of 30 seconds (No. 4 Ford cup, 20° C.)) was applied to a dry film thickness of 15 µm in two stages by air spraying. Between the two applications, there was a one-minute interval for setting. The second application was followed by a 5-minute interval for setting. Thereafter, preheating was carried out at 80° C. for 5 minutes.

After preheating, the coated sheets were allowed to cool to room temperature, and the solvent-borne clear coating E-2 of the previous production example was applied in one stage to a dry film thickness of 30 µm, followed by 7 minutes of setting. The coated sheets were then baked in a drier at 80° C. for 30 minutes. The coated sheets obtained were evaluated in the same manner as in Example 1.

EXAMPLES 3 and 4

According to each combination of water-borne intermediate coating, water-borne metallic base coating and clear coating shown in Table 1, multilayer coating films were produced in the same manner as in Example 1, and the coated sheets were evaluated in the same manner.

COMPARATIVE EXAMPLE 1

Using the combination of water-borne intermediate coating of melamine curing type, water-borne metallic base coating and clear coating as shown in Table 1, multilayer coating films were produced, and the coated sheets obtained were evaluated.

The evaluation results obtained in the above examples and comparative example are shown in Table 1.

TABLE 1

|  |  | Example | | | | Compar. Ex. |
| --- | --- | --- | --- | --- | --- | --- |
|  |  | 1 | 2 | 3 | 4 | 1 |
| Water-borne intermediate coating | Carbodiimide curing system | A-1 | A-2 |  | A-1 |  |
|  | Melamine curing system |  |  | B-1 |  | B-1 |
| Water-borne metallic base coating | Carbodiimide curing system | C-1 | C-1 | C-1 |  |  |
|  | Melamine curing system |  |  |  | D-1 | D-1 |
|  | Clear coating | E-1 | E-2 | E-1 | E-1 | E-1 |
| Evaluation results | Water resistance | ◎ | ◎ | ◎ | ◎ | Δ |
|  | Appearance | 1.0 | 1.0 | 1.0 | 1.0 | 0.7 |

As shown in the examples of this invention, the coating films formed by the water-borne intermediate coating of the carbodiimide curing type and the water-borne metallic base coating, when each coating film formation was followed by 5 minutes of preheating at 80° C., could provide a good appearance, without migration or bleeding possibly caused by the solvent component or the like contained in the coating subsequently applied. The coating films showed good water resistance.

What is claimed is:

1. A method of forming coating films one after another on a substrate which comprises, forming an intermediate coating film using a water-borne intermediate coating, forming a metallic base coating film using a water-borne metallic base coating on an intermediate coating film-formed surface, and forming a clear coating film using a clear coating on a metallic base coating film-formed surface, wherein said water-borne intermediate coating and/or said water-borne metallic base coating contains a polycarbodiimide compound and a carboxyl-containing aqueous resin, wherein said polycarbodiimide compound has a structure in which a carbodiimide unit and a polyol unit occur alternately via a urethane bond and repeatedly and a monoalkoxypolyalkylene oxide unit occurs as both molecular termini and is bound to a carbodiimide unit via a urethane bond, wherein said polyol unit is derived from at least one member selected from the group consisting of polyether diols, polyester diols and polycarbonate diols.

2. The method of forming coating films according to claim 1, wherein said polyol unit is derived from a polyol having a number average molecular weight of 300 to 5,000 and said monoalkoxypolyalkylene oxide unit is derived from a monoalkoxypolyalkylene glycol with a monoalkoxy group containing 4 to 20 carbon atoms.

3. The method of forming coating films according to claim 2, wherein the coating film formation is carried out by forming the clear coating film with the clear coating before curing the intermediate coating film and metallic base coating film and curing the thus-obtained multilayer coating films simultaneously.

4. The method for forming coating films according to claim 1, wherein the coating film formation is carried out by forming the clear coating film with the clear coating before curing the intermediate coating film and metallic base coating film and curing the thus-obtained multilayer coating films simultaneously.

5. A multilayer coating film obtained by a method of forming coating films one after another on a substrate, by forming an intermediate coating film using a water-borne intermediate coating, forming a metallic base coating film using a water-borne metallic base coating on an intermediate coating film-formed surface, and forming a clear coating film using a clear coating on a metallic base coating film-formed surface, wherein said water-borne intermediate coating and/or said water-borne metallic base coating contains a polycarbodiimide compound and a carboxyl-containing aqueous resin, wherein said polycarbodiimide compound has a structure in which a carbodiimide unit and a polyol unit occur alternately via a urethane bond and repeatedly and a monoalkoxypolyalkylene oxide unit occurs as both molecular termini and is bound to a carbodiimide unit via a urethane bond, wherein said polyol unit is derived from at least one member selected from the group consisting of polyether diols, polyester diols and polycarbonate diols.

6. A method of forming coating films one after another on a substrate which comprises, forming an intermediate coating film using a water-borne intermediate coating, forming a metallic base coating film using a water-borne metallic base coating on an intermediate coating film-formed surface, and forming a clear coating film using a clear coating on a metallic base coating film-formed surface, wherein said water-borne intermediate coating and/or said water-borne metallic base coating contains a polycarbodiimide compound and a carboxyl-containing aqueous resin, wherein said polycarbodiimide compound has a structure in which a carbodiimide unit and a polyol unit occur alternately via a urethane bond and repeatedly and a monoalkoxypolyalkylene oxide unit occurs as both molecular termini and is bound to a carbodiimide unit via a urethane bond, wherein said polyol unit is derived from a polyol having a number average molecular weight of 300 to 5,000 and said monoalkoxypolyalkylene oxide unit is derived from a monoalkoxypolyalkylene glycol with a monoalkoxy group containing 5 to 20 carbon atoms.

7. The method for forming coating films according to claim 6, wherein the coating film formation is carried out by forming the clear coating film with the clear coating before curing the intermediate coating film and metallic base coating film and curing the thus-obtained multilayer coating films simultaneously.

8. The method for forming coating films according to claim 6, wherein said monoalkoxypolyalkylene oxide unit is derived from a monoalkoxypolyalkylene glycol with a monoalkoxy group containing 8 to 20 carbon atoms.

9. The method for forming coating films according to claim 6, wherein said monoalkoxypolyalkylene oxide unit is derived from a monoalkoxypolyalkylene glycol with a monoalkoxy group containing 8 to 12 carbon atoms.

10. A multilayer coating film obtained by a method of forming coating films one after another on a substrate, by forming an intermediate coating film using a water-borne intermediate coating, forming a metallic base coating film using a water-borne metallic base coating and a clear coating film using a clear coating on an intermediate coating film-formed surface, and forming a clear coating film using a clear coating on a metallic base coating film-formed surface, wherein said water-borne intermediate coating and/or said water-borne metallic base coating contains a polycarbodiimide compound and a carboxyl-containing aqueous resin, wherein said polycarbodiimide compound has a structure in which a carbodiimide unit and a polyol unit occur alternately via a urethane bond and repeatedly and a monoalkoxypolyalkylene oxide unit occurs as both molecular termini and is bound to a carbodiimide unit via a urethane bond, wherein said polyol unit is derived from a polyol having a number average molecular weight of 300 to 5,000 and said monoalkoxypolyalkylene oxide unit is derived from a monoalkoxypolyalkylene glycol with a monoalkoxy group containing 5 to 20 carbon atoms.

11. The multilayer coating film according to claim 10, wherein said monoalkoxypolyalkylene oxide unit is derived from a monoalkoxypolyalkylene glycol with a monoalkoxy group containing 8 to 20 carbon atoms.

12. The multilayer coating film according to claim 10, wherein said monoalkoxypolyalkylene oxide unite is derived from a monoalkoxypolyalkylene glycol with a monoalkoxy group containing 8 to 12 carbon atoms.

* * * * *